(12) United States Patent
Gleasman et al.

(10) Patent No.: US 6,983,680 B2
(45) Date of Patent: Jan. 10, 2006

(54) LONG-PISTON HYDRAULIC MACHINES

(75) Inventors: Vernon E. Gleasman, Pittsford, NY (US); Keith E. Gleasman, Fairport, NY (US); Matthew R. Wrona, Fairport, NY (US)

(73) Assignee: Torvec, Inc., Pittsford, NY (US)

( * ) Notice: Subject to any disclaimer, the term of this patent is extended or adjusted under 35 U.S.C. 154(b) by 0 days.

(21) Appl. No.: 10/789,739

(22) Filed: Feb. 27, 2004

(65) Prior Publication Data
US 2004/0168567 A1 Sep. 2, 2004

Related U.S. Application Data

(63) Continuation-in-part of application No. 10/647,557, filed on Aug. 25, 2003, now abandoned, and a continuation-in-part of application No. 10/229,407, filed on Aug. 28, 2002, now abandoned.

(51) Int. Cl.
*F01B 3/02* (2006.01)
(52) U.S. Cl. .............................. 91/499; 92/71; 92/153; 92/169.1; 184/6.17; 184/18
(58) Field of Classification Search .................. 91/499; 92/71, 153, 169.1; 184/6.17, 18; 417/269
See application file for complete search history.

(56) References Cited

U.S. PATENT DOCUMENTS

| | | | |
|---|---|---|---|
| 1,840,865 A | 1/1932 | Rayburn et al. | 60/453 |
| 1,931,543 A | 10/1933 | High | 417/269 |
| 2,166,857 A | 7/1939 | Bugatti | 92/153 |
| 2,672,095 A | 3/1954 | Lucien et al. | 417/269 |
| 2,678,536 A | 5/1954 | Morgan | 60/455 |
| 2,913,993 A | 11/1959 | Toulmin, Jr. | 91/488 |
| 2,957,421 A | 10/1960 | Mock | 417/222.1 |
| 3,018,737 A | 1/1962 | Cook et al. | 417/269 |
| 3,056,387 A | 10/1962 | Budzich | 91/507 |
| 3,161,023 A | 12/1964 | Margolin et al. | 60/488 |
| 3,292,554 A | 12/1966 | Hessler | 417/269 |
| 3,304,886 A | 2/1967 | Roberts | 417/222.1 |
| 3,616,726 A | 11/1971 | Ruger | 91/488 |
| 3,861,276 A | 1/1975 | Lucien | 91/499 |
| 4,007,663 A | 2/1977 | Nagatomo et al. | 91/6.5 |
| 4,232,587 A | 11/1980 | Kline | 91/499 |
| 4,478,130 A | 10/1984 | Brenner et al. | 91/6.5 |
| 4,637,293 A | 1/1987 | Yamaguchi et al. | 91/507 |
| 4,776,260 A | 10/1988 | Vincze | 417/269 |
| 4,843,817 A | 7/1989 | Shivvers et al. | 60/487 |
| 4,852,463 A | 8/1989 | Wagenseil | 91/488 |
| 4,901,529 A | 2/1990 | Iino et al. | 60/489 |

(Continued)

*Primary Examiner*—Michael Koczo, Jr.
(74) *Attorney, Agent, or Firm*—Brown & Michaels, PC; Morton A. Polster

(57) ABSTRACT

Smaller and lighter hydraulic pump/motors provide remarkably improved volumetric efficiency with pistons having body portions substantially as long as the axial length of the respective cylinders in which they reciprocate. A plurality of respective lubricating channels form a single, continuous lubricating passageway entirely within the cylinder block and not connected by either fluid "input" or fluid "output" passageways, being replenished solely by a minimal flow of fluid to and from the valve end of each cylinder and passing between each respective cylindrical wall of each cylinder and the axial cylindrical body of each respective piston. Several embodiments are disclosed in combination with various spring-biased hold-down assemblies. The preferred embodiment included a fixed cylinder block, a roller bearing mounting between the wobbler and rotor of a split-swash plate, with piston shoes contacting the wobbler directly without any intermediary apparatus.

15 Claims, 10 Drawing Sheets

U.S. PATENT DOCUMENTS

| | | | |
|---|---|---|---|
| 4,944,154 A | 7/1990 | Kawahara et al. | 60/488 |
| 4,967,556 A | 11/1990 | Inour | 60/489 |
| 4,993,380 A | 2/1991 | Hsu | 92/153 |
| 5,000,667 A | 3/1991 | Taguchi et al. | 417/222.1 |
| 5,440,878 A | 8/1995 | Gleasman et al. | 60/487 |
| 5,513,553 A | 5/1996 | Gleasman et al. | 92/12.2 |
| 5,630,707 A | 5/1997 | Kim et al. | 417/269 |
| 5,704,272 A | 1/1998 | Durako et al. | 92/57 |
| 5,988,041 A | 11/1999 | Hiramatsu et al. | 92/71 |
| 6,085,521 A | 7/2000 | Folsom et al. | 60/490 |
| 6,216,670 B1 | 4/2001 | Anderson et al. | 417/269 |
| 6,321,635 B1 | 11/2001 | Fujita | 92/71 |
| 6,568,917 B2 | 5/2003 | Fujii et al. | 417/269 |
| 6,644,936 B1 | 11/2003 | Muta | 417/269 |
| 6,663,354 B2 | 12/2003 | Forster | 417/269 |
| 6,786,704 B2 | 9/2004 | Kamiya et al. | 417/222.2 |

LONG-PISTON HYDRAULIC MACHINES

RELATED APPLICATIONS

This application is a Continuation-In-Part of U.S. parent application Ser. No. 10/229,407 filed 28 Aug. 2002 now abandoned and Continuation-In-Part Application Ser. No. 10/647,557 filed 25 Aug. 2003, now abandoned, which applications are hereby incorporated by reference.

TECHNICAL FIELD

This invention relates to liquid hydraulic pump/motor machines appropriate for relatively "heavy duty" automotive use, e.g., for hydraulic transmissions used for vehicle locomotion and/or for the storing and retrieval of fluids in energy-saving accumulator systems. [Note: the term "liquid" is used to distinguish from "gas" hydraulic pumps, e.g., pumps for compressing air and/or other gases.]

BACKGROUND

Hydraulic pumps and motor are well known and widely used, having reciprocating pistons mounted in respective cylinders formed in a cylinder block and positioned circumferentially at a first radial distance about the rotational axis of a drive element. Many of these pump/motor machines have variable displacement capabilities, and they are generally of two basic designs: (a) either the pistons reciprocate in a rotating cylinder block against a variably inclined, but otherwise fixed, swash-plate; or (b) the pistons reciprocate in a fixed cylinder block against a variably inclined and rotating swash-plate that is often split to include-a non-rotating (i.e., nutating-only) "wobbler" that slides upon the surface of a rotating and nutating rotor. While the invention herein is applicable to both of these designs, it is particularly appropriate for, and is described herein as, an improvement in the latter type of machine in which the pistons reciprocate in a fixed cylinder block.

As indicated above, this invention is directed to "liquid" (as distinguished from "gas") type hydraulic machines and it should be understood that the terms "fluid(s)" and "pressurized fluid(s)," as used herein throughout the specification and claims, are intended to identify incompressible liquids rather than compressible gasses. Because of the incompressibility of liquids, the pressure and load duty cycles of the these two different types of hydraulic machines are so radically different that designs for the gas compression type machines are inappropriate for use in the liquid-type machines, and visa versa. Therefore, the following remarks should all be understood to be directed and applicable to liquid-type hydraulic machines and, primarily, to such heavy duty automotive applications as those identified in the Technical Field section above.

Hydraulic machines with fixed cylinder blocks can be built much lighter and smaller than the machines that must support and protect heavy rotating cylinder blocks. However, these lighter machines require rotating and nutating swash-plate assemblies that are difficult to mount and support. For high-pressure/high-speed service, the swash-plate assembly must be supported in a manner that allows for the relative motion between the heads of the non-rotating pistons and a mating flat surface of the rotating and nutating swash-plate. As just indicated above, such prior art swash-plates have often been split into a rotating/nutating rotor portion and a nutating-only wobbler portion, the latter including the flat surface that mates with the heads of the non-rotating pistons through connecting "dog bones".

That is, such fixed-cylinder-block machines have heretofore used a "dog-bone" extension rod (i.e., a rod with two spherical ends) to interconnect one end of each piston with the flat surface of the nutating-but-not-rotating wobbler. One spherical end of the dog bone is pivotally mounted into the head end of the piston, while the other spherical end is usually covered by a pivotally-mounted conventional "shoe" element that must be held at all times in full and flat contact against the flat surface of the swash-plate wobbler during all relative motions between the heads of the non-rotating pistons and a mating flat surface of the nutating swash-plate. As is well known in the art, these relative motions follow varying non-circular paths that occur at all inclinations of the swash-plate away from 0°. These dog-bones greatly increase the complexity and cost of building the rotating swash-plates of these lighter machines.

Dog-bone rods are also sometimes used to interconnect one end of each piston with the inclined (but not rotating) swash-plates of hydraulic machines with rotating cylinder blocks. However, more often this latter type of machine omits such dog-bones, using instead elongated pistons, each having a spherical head at one end (again, usually covered by a pivotally-mounted conventional shoe element) that effectively contacts the non-rotating flat surface of the swash-plate. Such elongated pistons are designed so that a significant portion of the axial cylindrical body of each piston remains supported by the walls of its respective cylinder at all times during even the maximum stroke of the piston. This additional support for such elongated pistons is designed to assure minimal lateral displacement of each spherical piston head as it slides over the inclined-but-not-rotating swash-plate when the pistons rotate with their cylinder block.

Generally, these elongated pistons are primarily lubricated by "blow-by", i.e., that portion of the high pressure fluid that is forced between the walls of each cylinder and the outer circumference of each piston body as the reciprocating piston drives or is driven by high pressure fluid. Such blow-by provides good lubrication only if tolerances permit the flow of sufficient fluid between the walls of the cylinder and the long cylindrical body of the piston, and blow-by sufficient to assure good lubrication often negatively effects the volumetric efficiency of the pump or motor machine. For instance, a 10 cubic inch machine can use as much as 4 gallons of fluid per minute for blow-by. While smaller tolerances can often be used to reduce blow-by, the reduction of such tolerances is limited by the needs for adequate lubrication that increase with the size of the pressure and duty loads of the machine. Of course, such blow-by is accomplished by using fluid that would otherwise be used to drive or be driven by the pistons to accomplish work. Therefore, in the example just given above, the 4 gallons of fluid per minute used for blow-by lubrication, reduces the volumetric efficiency of the machine.

The invention disclosed below is directed to improving the volumetric efficiency of such elongated-piston machines while, at the same time, assuring (a) appropriate lubrication of the pistons and (b) simplification of the apparatus used to maintain contact between the pistons and the swash-plate.

SUMMARY OF THE INVENTION

The invention is disclosed on various embodiments of hydraulic machines, all of which share a novel combination of simple structural features including elongated pistons reciprocating in a fixed cylinder block, cylinders provided with unique lubrication recesses, and shoes directly attached to each piston (without dog bones) that make sliding contact with a rotating and nutating swash-plate or, preferably, with the nutating-only wobbler portion of a split swash-plate. These simple structural features synergistically result in (a) a remarkable 90% increase in volumetric efficiency and (b) such increased mechanical efficiency that even the drive shafts of machines as large as 12-cubic inch capacity can be easily turned by hand when the machine is fully assembled.

Each disclosed machine can operate as either a pump or a motor. One embodiment has a swash-plate that, while rotating at all times with the drive element of the machine, is fixed at a predetermined inclined angle relative to the axis of the drive element so that the piston move at a maximum predetermined stroke at all times. The swash-plate of the other disclosed machine have inclinations that can be varied throughout a range of angles in a manner well known in the art to control the stroke of the pistons throughout a range of movements up to a maximum in each direction. [However, persons skilled in the art will appreciate that the invention is equally applicable to hydraulic machines with rotating cylinder blocks and swash-plate that do not rotate with the drive element of the machines.]

In each machine according to the invention, each piston is elongated, having an axially cylindrical body portion that preferably is substantially as long as the axial length of the respective cylinder in which it reciprocates. Preferably, each piston also has a spherical head end that, by means of a conventionally pivoted shoe and relatively simple apparatus, is maintained in effective sliding contact with a flat face of the machine's swash-plate. The axial length of each cylindrical piston body is selected to assure minimal lateral displacement of the spherical first end of the piston at all times. Therefore, the preferable piston for this invention is "elongated". That is, even when each piston is extended to its maximum stroke, that portion of the piston body which is still supported within its respective cylinder is sufficient to assure a minimal lateral displacement of the extended spherical end of the piston at all times during machine operation.

[NOTE: to facilitate explanation of the invention, each piston is described as having an axial cylindrical body portion and a spherical head end, while each respective cylinder has a valve end and an open head portion beyond which the spherical head end of each piston extends at all times. Further, for all preferred embodiments, it is assumed that each disclosed hydraulic machine (e.g., whether motor or pump) is paired with a similar hydraulic machine (e.g., a mating pump or motor) in a well known "closed loop" arrangement (see FIG. 10) wherein the high-pressure fluid exiting from the outlet 139 of each pump 110 is directly delivered to the input 36 of the related motor 10, while the low-pressure fluid exiting from the outlet 37 of each motor 10 is directly delivered to the input 136 of the related pump 110. As understood in the art, a portion of the fluid in this closed loop system is continually lost to "blow-by" and is collected in a sump; and fluid is automatically delivered from the sump back into the closed loop, by a charge pump, to maintain a predetermined volume of fluid in the closed loop system at all times.]

According to the invention, each cylinder formed within the cylinder blocks of each machine is provided with a respective lubricating channel formed in the cylindrical wall of each cylinder. This lubricating channel is positioned so that at all times during reciprocation of the piston within its respective cylinder, each respective lubricating channel remains almost completely closed by the axial cylindrical body of the piston during its entire stroke. [The movement of fluid in these lubricating channels is discussed in greater detail beginning two paragraphs below.] Preferably, each respective lubricating channel is formed circumferentially and radially transects each cylinder.

Also formed in the fixed cylinder block of each machine are a plurality of further passageways that interconnect each of the just-described lubricating channels. The interconnection of all of the lubricating channels, one to another, forms a single, continuous lubricating passageway in the cylinder block. This continuous lubricating passageway is formed entirely within the cylinder block, preferably transecting each cylinder and being centered circumferentially at substantially the same radial distance as the cylinders are centered about the rotational axis of the drive element.

Special attention is called to the fact that, in the preferred embodiments disclosed, the continuous lubricating passageway just described above is not connected by either fluid "input" or fluid "output" passageways but instead is almost completely closed off by the cylindrical body portions of the pistons at all times during operation of the machine. Therefore, the only source of lubricating fluid supplying this continuous lubricating passageway is a secondary minimal flow of fluid between each of the respective cylindrical walls of each cylinder and the axial cylindrical body of each respective piston. During operation, this lubricating passageway almost instantly fills with an initial minimal flow of high-pressure fluid that enters at the valve end of each cylinder and then passes between the walls of each cylinder and the outer circumference of the body portion of each driven piston. This secondary minimal flow effectively maintains high pressure within the continuous lubricating passageway at all times. If necessary, a plurality of sealing members, each located respectively near the open end of each cylinder, can optionally provide a relatively tight seal for substantially eliminating blow-by between the body portion of each piston and the open head portion of each respective cylinder, thereby allowing the escape of only minimal blow-by from this lubricating passageway past the open end of the cylinders. However, in actual practice it has been found that only a relatively minimal blow-by from the open end of the cylinders moves past the elongated pistons of the invention and, since a small amount of blow-by mist is required for adequate lubrication of the drive shaft bearings, etc., such optional sealing members may not be necessary.

Nonetheless, the lubricating fluid in this closed continuous lubricating passageway moves constantly as the result of the ever-changing pressures in each of the respective cylinders as the pistons reciprocate. That is, as the pressure in each cylinder is reduced to low pressure on the return stroke of each piston, the high pressure fluid in the otherwise closed lubricating passageway is again driven between the walls of each cylinder and the outer circumference of the body of each piston into the valve end of each cylinder experiencing such pressure reduction. However, the lubricating fluid that is driven toward low pressure is not "lost", i.e., it is not "blow-by" and is in returned to the sump to be replenished into the closed loop hydraulic system by the charge pump. Instead, this low pressure lubricating fluid is immediately returned to the closed loop without requiring the use of a charge pump, and the closed continuous lubricating passageway is immediately replenished by the entrance of a similar flow of high-pressure fluid from the valve end of each cylinder experiencing increased pressure.

The just-described lubricating passageway provides appropriate lubrication for the high-speed reciprocation of the pistons while substantially reducing blow-by. During successful operation of commercial prototypes built according to the invention, blow-by was reduced by 90%. That is, the blow-by experienced by conventional commercial hydraulic machines of comparable specifications generally ranges between 4–5 gallons per minute, while the blow-by experienced by the invention's prototypes ranges between 0.5–0.7 gallons per minute, thereby remarkably increasing the volumetric efficiency of the invention's hydraulic machines.

As indicated above, fixed-cylinder-block hydraulic machines can be built smaller and lighter than conventional rotating block hydraulic machines having similar specifications. As a result of the improved lubrication of the elongated pistons, the disclosed invention makes it possible to use these smaller and lighter designs to meet the high-speed/high-pressure specifications required for automotive use.

Further, special attention is called to the invention's significantly simplified support assemblies for the variable rotating swash-plates of the invention's disclosed hydraulic machines. All of the invention's support assemblies disclosed herein omit dog-bones that normally are mounted between the outer end of each piston and the nutating-only wobbler portion of a conventional rotating/nutating swash-plate. Further, one embodiment also omits the nutating-only wobbler portion of a conventional rotating/nutating swash-plate. In all embodiments, a conventional shoe is mounted directly to the spherical head of each piston and is maintained in effective sliding contact with the flat face portion of the swash-plate by means of a minimal spring bias sufficient to maintain such effective sliding contact in the absence of hydraulic pressure at the valve ends of the pump's cylinders.

Three simplified support mechanisms are disclosed: The first simplified support mechanism comprises a unique hold-down plate assembly biased by a single coil spring positioned circumferentially about the rotational axis of the pump's drive element. The invention's second support mechanism is even simpler, comprising nothing more than a conventional shoe mounted directly to the spherical head of each piston, with the minimal bias being supplied by a plurality of springs, each spring being positioned respectively within the body portion of each respective piston between the body portion of each respective piston and the valve end of each respective cylinder. While the second support mechanism is a little more difficult to assemble than the first, the latter is considerably simpler, lighter, and cheaper to manufacture.

The third of the disclosed simplified support mechanisms is the preferred arrangement. Namely, it includes a traditional split swash-plate, but modified by adding needle bearings to support the nutating-only wobbler portion on the nutating/rotating rotor member. While this third embodiment also includes a unique hold-down plate assembly similar to the first embodiment, this latter hold-down plate is biased by a plurality of springs, each spring being positioned, respectively, circumferentially about the sliding shoe associated with the head of each piston. This third embodiment provides a dramatic change in the dynamics of operation of the sliding shoes, significantly reducing the surface speed of the relative motion between the shoes and the swash-plate and, thereby, resulting in a reduction in wear and costs, and in a significant increase in machine efficiency.

The important changes introduced by this invention provide hydraulic machines that are lighter and smaller than conventional machines having similar specifications. Further, as indicated above, actual testing of working prototypes have proven that this invention provides machines with significantly increased volumetric and mechanical efficiency. In short, the invention disclosed herein provides machines having remarkably greater efficiency while significantly reducing the weight and size of the machines as well as the cost of manufacture and simplifying assembly.

DRAWINGS

Figure 1:
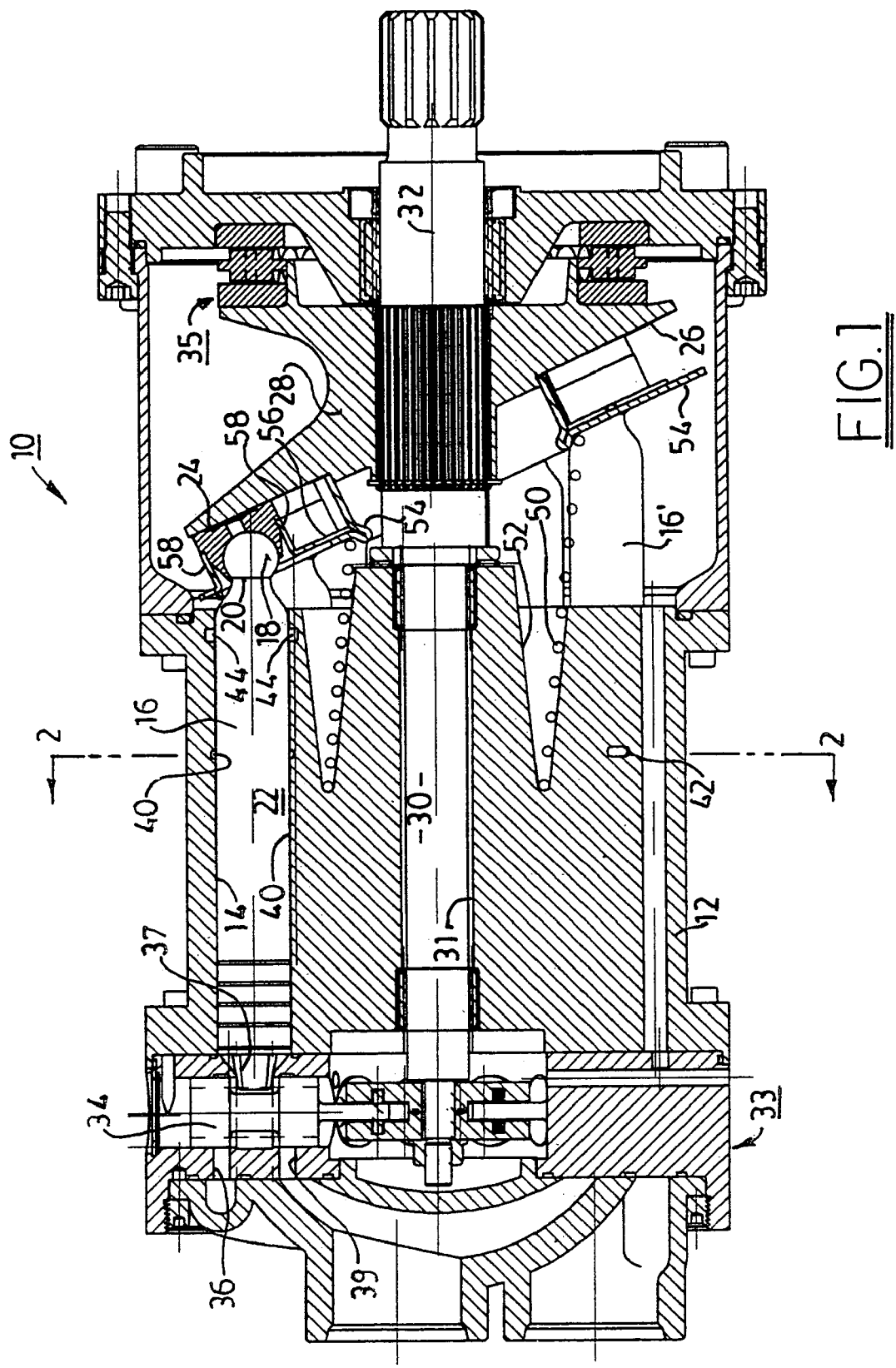
FIG. 1 is a partially schematic and cross-sectional view of a hydraulic machine with a fixed cylinder block and a rotating/nutating swash-plate having a fixed angle of inclination, showing features of the invention incorporated in the cylinder block and at the piston/swash-plate interface.
Figure 3:
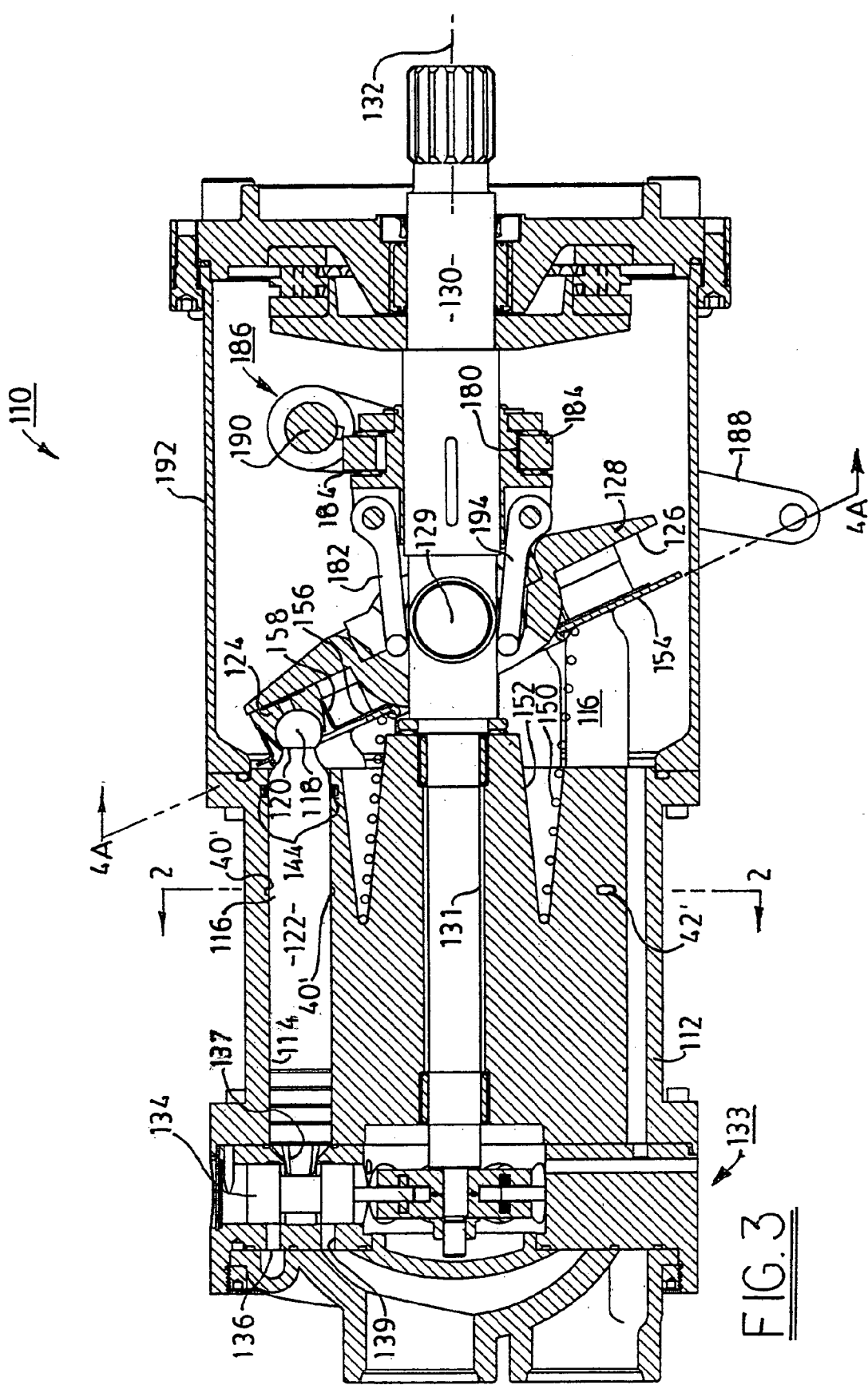
FIG. 3 is a partially schematic and cross-sectional view of a hydraulic machine with a fixed cylinder block and a rotating/nutating swash-plate having a variable angle of inclination, again showing features of the invention incorporated in the cylinder block and at the piston/swash-plate interface.
Figure 4:
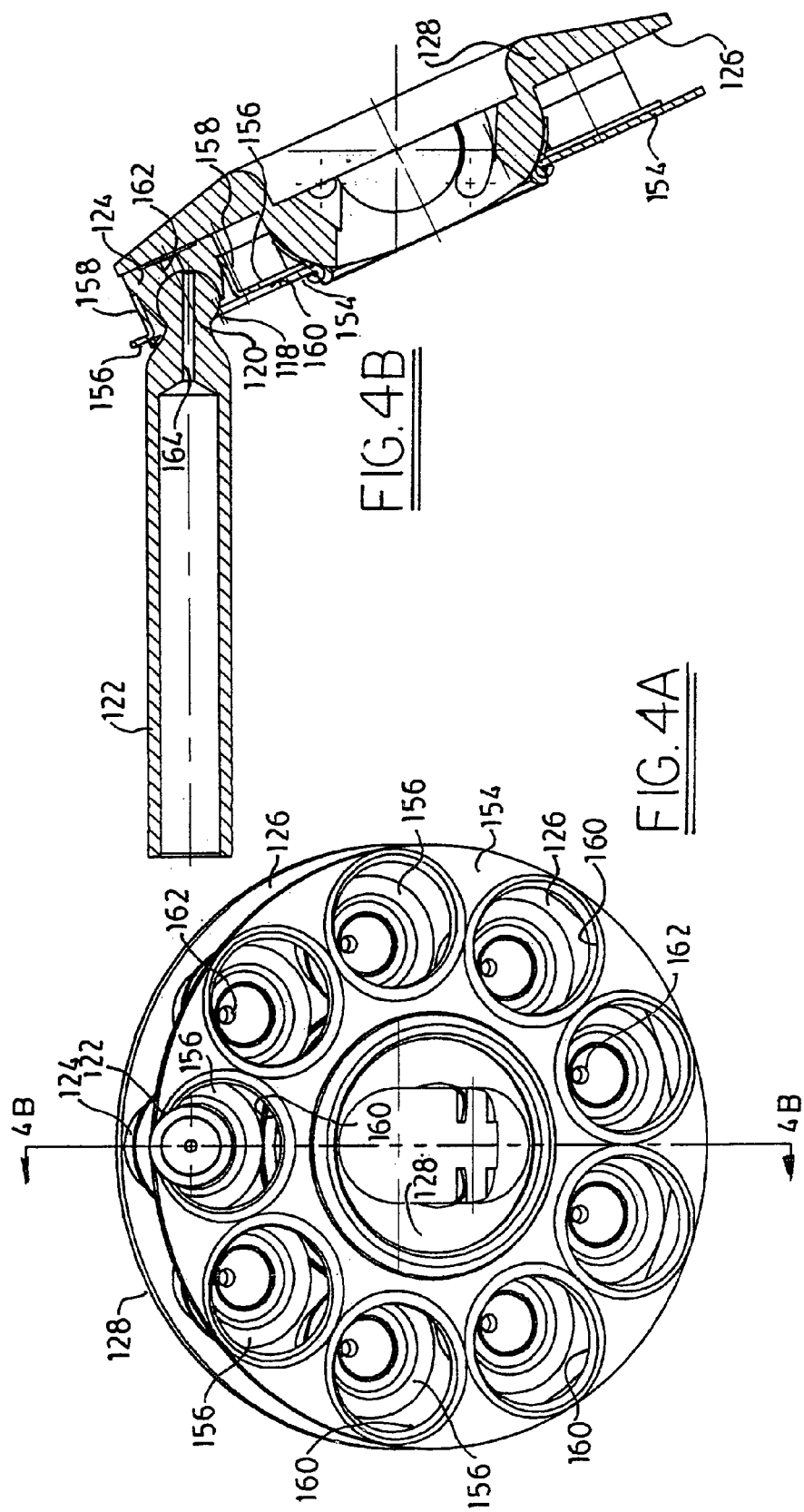

FIGS. 4A and 4B are partially schematic and cross-sectional views of the swash-plate and piston shoe hold-down assembly disclosed in FIGS. 1 and 3, with parts removed for clarity, showing relative positions of the head ends of the pistons, shoes, and special washers, as well as the spring-biased hold-down element that biases each sliding shoe against the flat face of the swash-plate when the swash plate is inclined at +25°, the view in FIG. 4A being taken in the plane 4A—4A of FIG. 3 in the direction of the arrows, while the view in FIG. 4B is taken in the plane 4B—4B of FIG. 4A.

Figure 5:
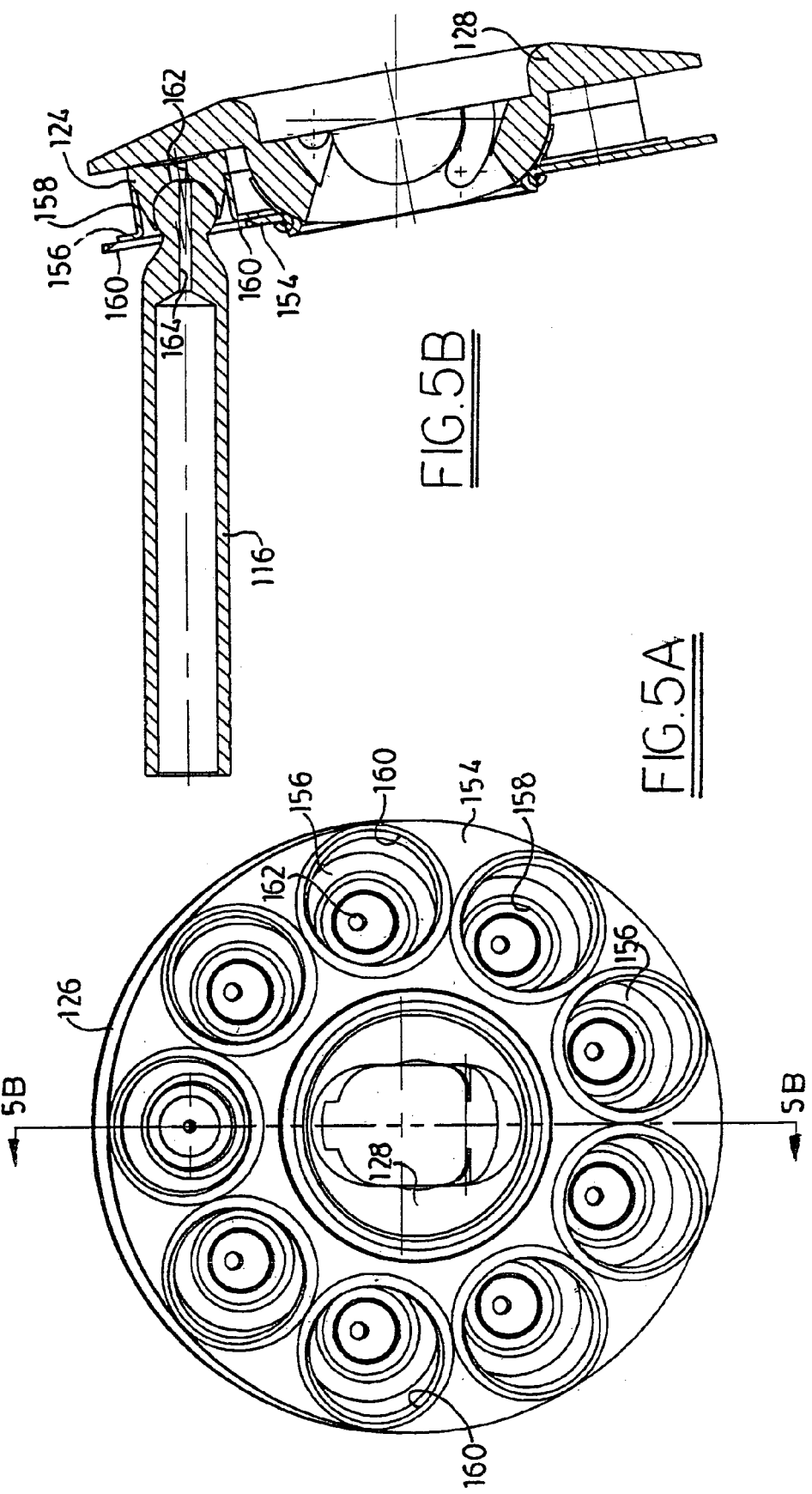
Figure 6:
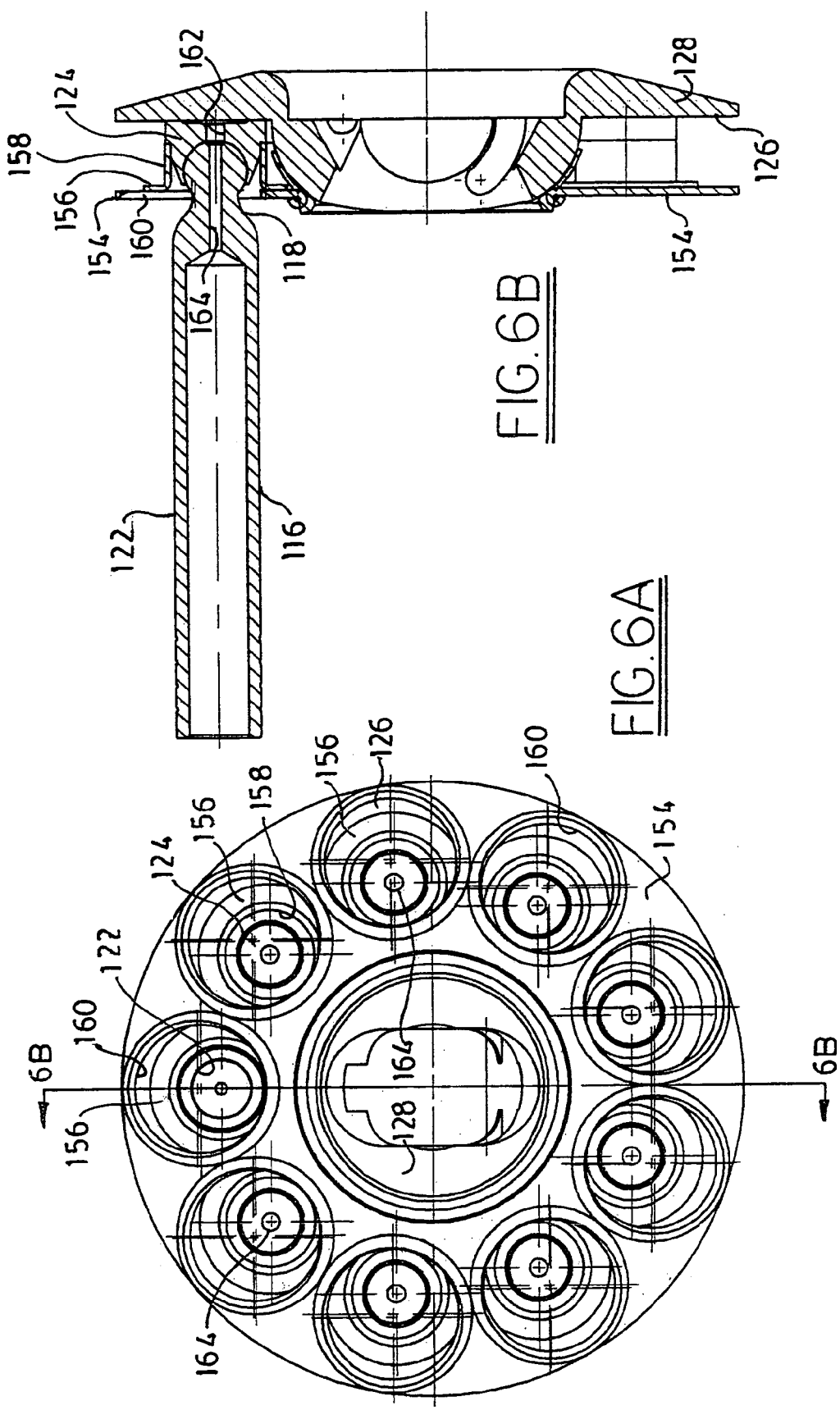
Figure 7:
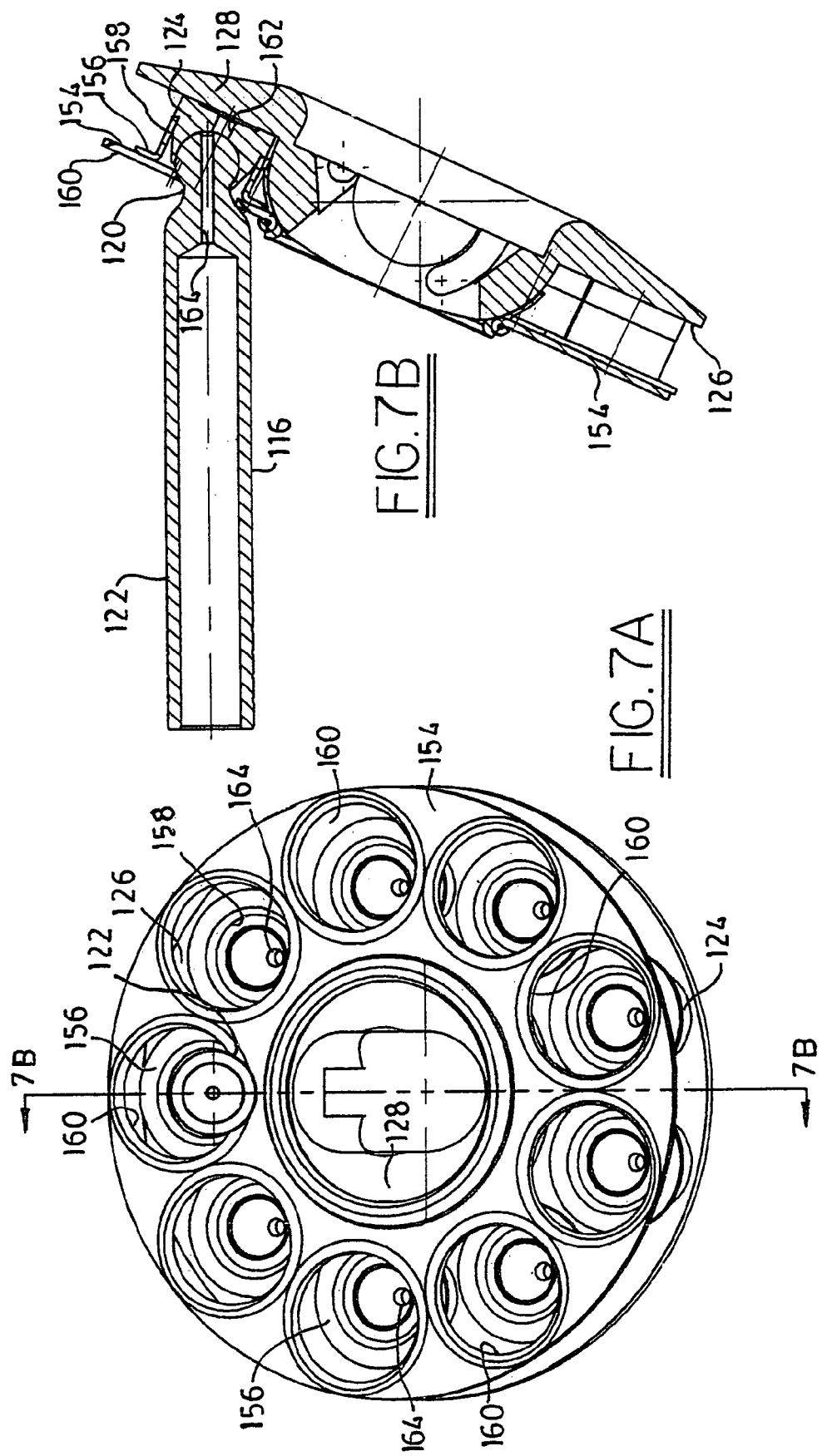

FIGS. 5A and 5B, 6A and 6B, and 7A and 7B are views of the same parts illustrated in FIGS. 4A and 4B when the swash-plate is inclined, respectively, at +15°, 0°, and −25°, the respective views in FIGS. 5B, 6B, and 7B being taken in the respective planes 5B—5B, 6B—6B, and 7B—7B of FIGS. 5A, 6A and 7A.

Figure 8:
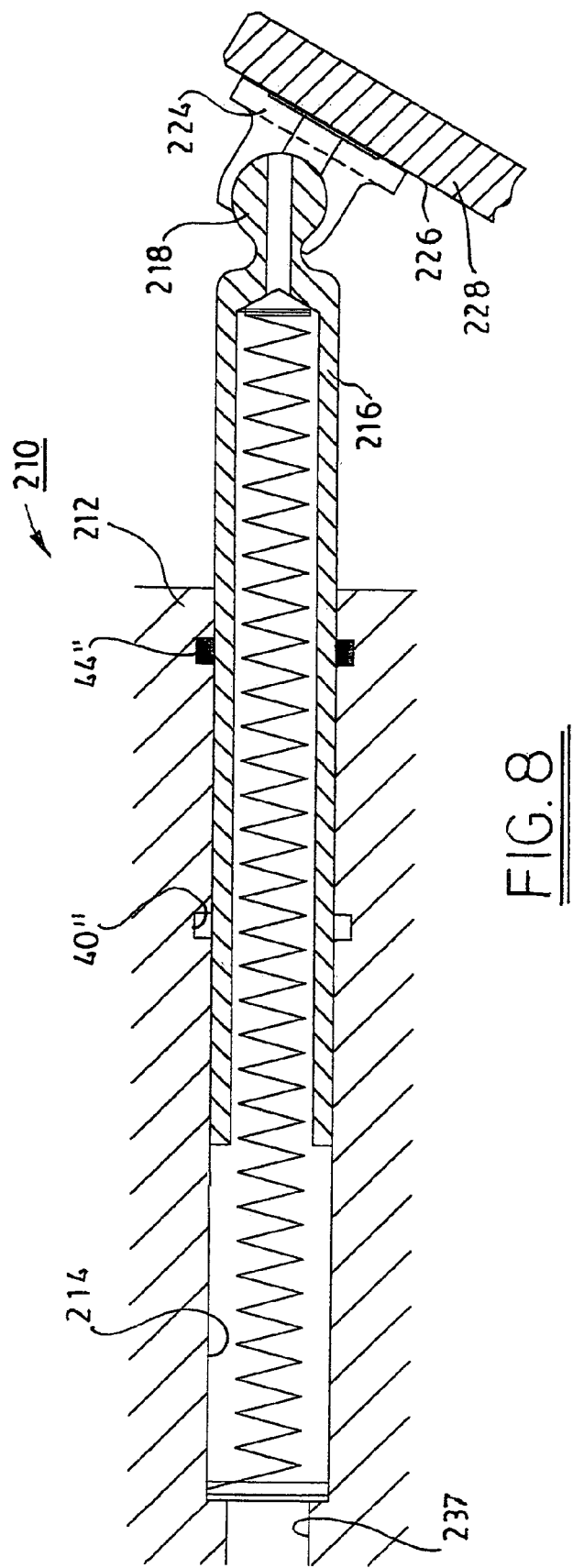

FIG. 8 is an enlarged, partial, schematic and cross-sectional view of only a single cylinder and piston for another hydraulic machine similar to those shown in FIGS. 1 and 3 but showing a more simplified second embodiment of a spring-biased hold-down assembly for the invention's piston shoes.

Figure 9:
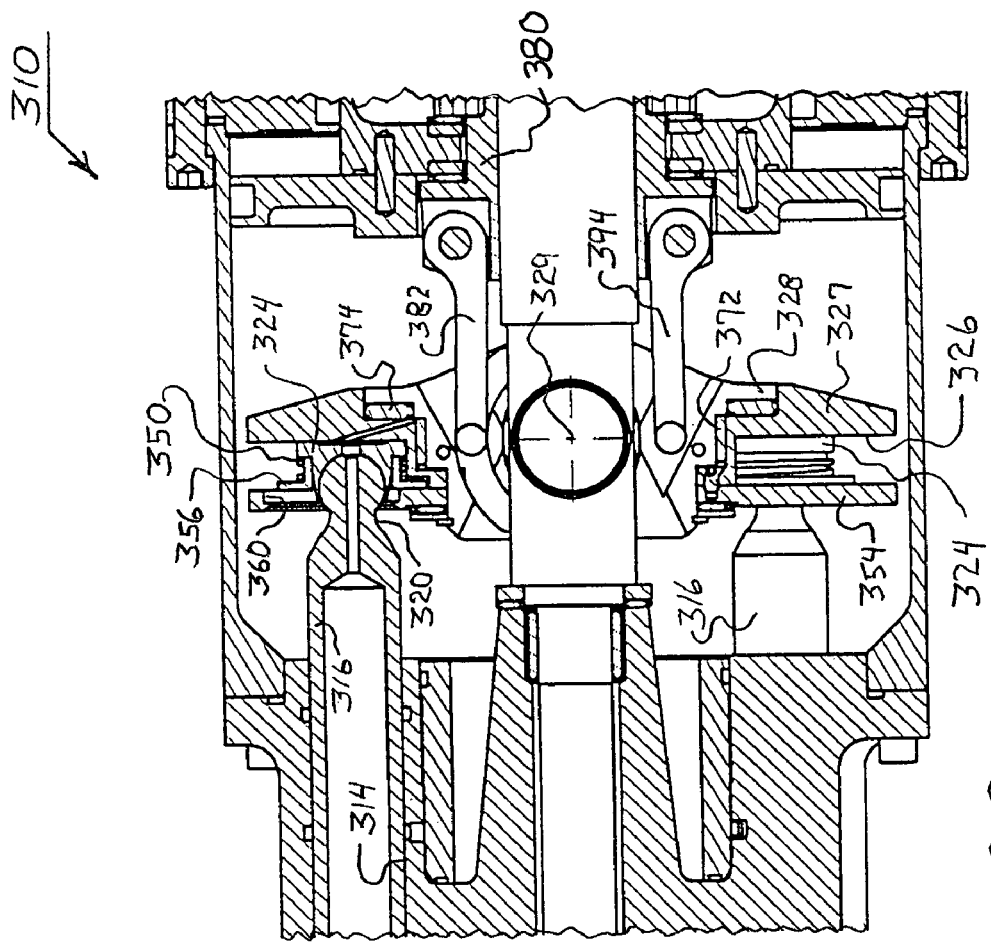

FIG. 9 is a partially schematic and cross-sectional view of another embodiment of the invention, showing a portion of another hydraulic machine with a fixed cylinder block substantially identical to that disclosed in FIG. 3 but including an improved version of a conventional split swash-plate with a variable angle of inclination and having a nutating-only wobbler mounted on a rotating/nutating rotor, this view omitting the valve end of the cylinder block and portions of the housing as well as other parts for clarity.

Figure 10:
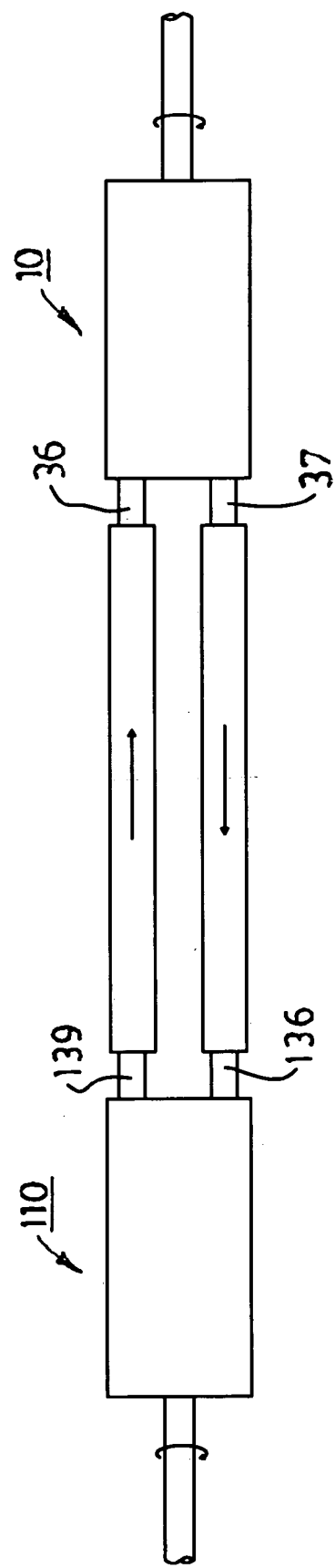

FIG. 10 is a view of a prior art "closed loop" arrangement of two hydraulic machines.

DETAILED DESCRIPTION

The operation of hydraulic machines of the type to which the invention may be added is well known. Therefore, such operation will not be described in detail. As indicated above, it can be assumed that each disclosed machine is connected in a well known "closed loop" hydraulic system with an appropriately mated pump or motor.

Hydraulic Motor

Referring to FIG. 1, hydraulic motor 10 includes a fixed cylinder block 12 having a plurality of cylinders 14 (only one shown) in which a respective plurality of mating pistons 16 reciprocate between the retracted position of piston 16 and the extended position of piston 16'. Each piston has a spherical head 18 that is mounted on a neck 20 at one end of an elongated axial cylindrical body portion 22 that, in the preferred embodiments shown, is substantially as long as the length of each respective cylinder 14.

Each spherical end 18 fits within a respective shoe 24 that slides over a flat face 26 formed on the surface of a rotor 28 that, in turn, is fixed to a drive element, namely, shaft 30 of the machine. Shaft 30 is supported on bearings within a bore 31 in the center of cylinder block 12. Flat face 26 of rotor 28 is inclined at a predetermined maximum angle (e.g., 25°) to the axis 32 of drive shaft 30.

A modular valve assembly 33, which is bolted as a cap on the left end of cylinder block 12, includes a plurality of spool valves 34 (only one shown) that regulates the delivery of fluid into and out the cylinders 14. As indicated above, each of the machines disclosed can be operated as either a pump or as a motor. For this description of a preferred embodiment, the fixed-angle swash-plate machine shown in FIG. 1 is being operated as a motor. Therefore, during the first half of each revolution of drive shaft 30, high pressure fluid from inlet 36 enters the valve end of each respective cylinder 14 through a port 37 to drive each respective piston from its retracted position to its fully extended position; and during the second half of each revolution, lower pressure fluid is withdrawn from each respective cylinder through port 37 and fluid outlet 39 as each piston returns to its fully retracted position.

In a manner well known in the art: fluid inlet 36 and outlet 39 are preferably connected through appropriate "closed loop" piping to a matching hydraulic pump so that, at all times, fluid pressure biases spherical ends 18 and respective shoes 24 against flat surface 26. The serial extension and retraction of each respective piston causes rotor 28 to rotate, thereby driving shaft 30.

Also, as well known in the art, motor 10 is connected in a closed loop of circulating hydraulic fluid with a mating hydraulic pump (e.g., pump 110 shown in FIG. 3 and discussed below); and flat face 26 is fixed at the maximum angle of inclination so that, when the flow rate of hydraulic fluid being circulated in the closed loop through inlet 36 and outlet 39 is relatively small, pistons 16 reciprocate relatively slowly, resulting in a relatively slow rotation of drive shaft 30.

However, as the flow rates of fluid circulation in the closed loop increase, the reciprocation of the pistons increases accordingly, and so does the speed of rotation of drive shaft 30. When operated at automotive speeds or pressures (e.g., up to 4000 rpm or 4000 psi), lubrication of the pistons becomes critical, and blow-by losses can also greatly increase. Cylinder block 12 is modified by the invention to address such lubrication needs and to reduce such blow-by losses.

Figure 2:
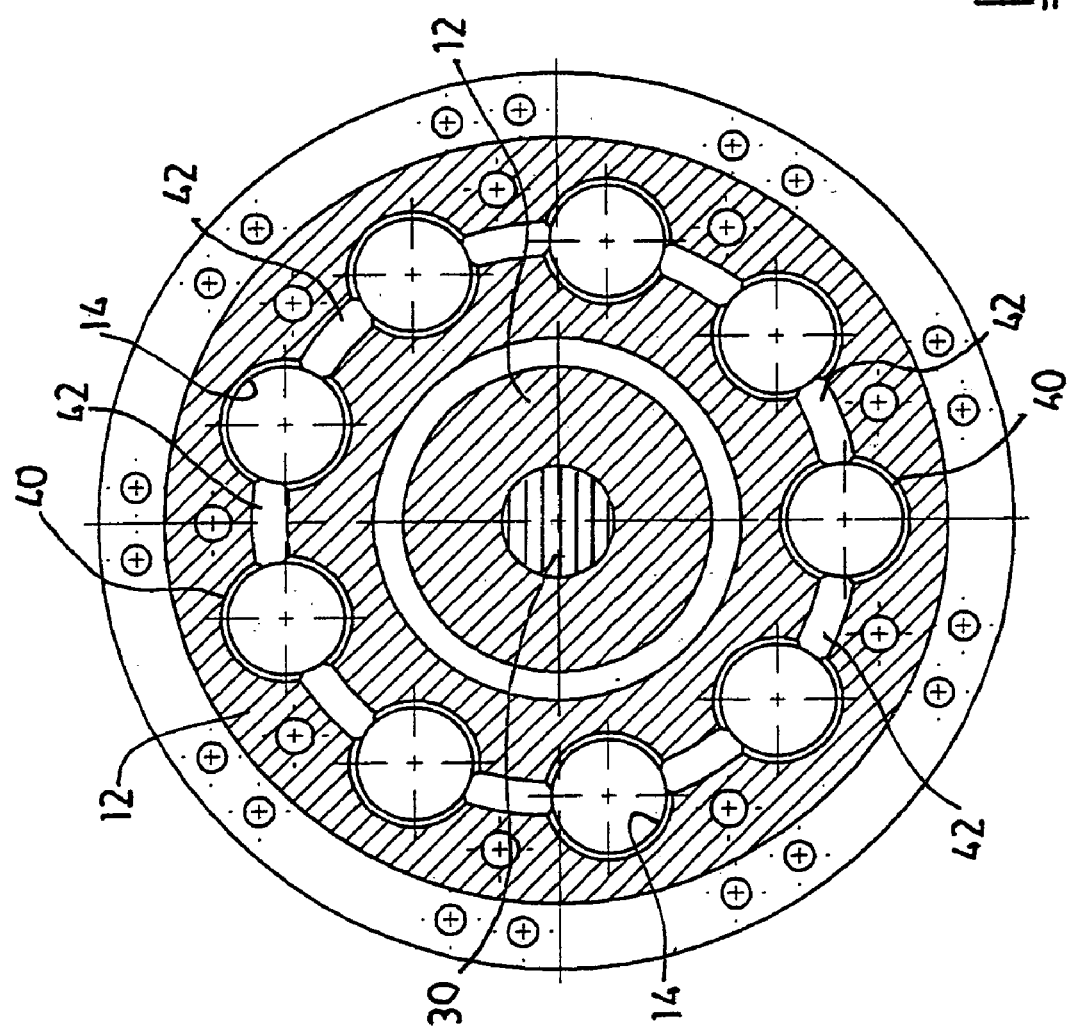
FIG. 2 is a partially schematic and cross-sectional view of the fixed cylinder block of the hydraulic machine of FIG. 1 taken along the plane 2—2 with parts being omitted for clarity.

Referring now to both FIGS. 1 and 2, the cylindrical wall of each cylinder 14 is transected radially by a respective lubricating channel 40 formed circumferentially therein. A plurality of passageways 42 interconnect all lubricating channels 40 to form a continuous lubricating passageway in cylinder block 12. Each respective lubricating channel 40 is substantially closed by the axial cylindrical body 22 of each respective piston 16 during the entire stroke of each piston. That is, the outer circumference of each cylindrical body 22 acts as a wall that encloses each respective lubricating channel 40 at all times. Thus, even when pistons 16 are reciprocating through maximum strokes, the continuous lubricating passageway interconnecting all lubricating channels 40 remains substantially closed off. Continuous lubricating passageway 40, 42 is simply and economically formed within cylinder block 12 as can be best appreciated from the schematic illustration in FIG. 2 in which the relative size of the fluid channels and connecting passageways and has been exaggerated for clarification.

During operation of hydraulic motor 10, all interconnected lubricating channels 40 are filled almost instantly by a minimal flow of high-pressure fluid from inlet 36 entering each cylinder 14 through port 37 and being forced between the walls of the cylinders and the outer circumference of each piston 16. Loss of lubricating fluid from each lubricating channel 40 is restricted by a surrounding seal 44 located near the open end of each cylinder 14. Nonetheless, the lubricating fluid in this closed continuous lubricating passageway of lubricating channels 40 flows moderately but continuously as the result of a continuous minimal flow of fluid between each of the respective cylindrical walls of each cylinder and the axial cylindrical body of each respective piston in response to piston motion and to the changing pressures in each half-cycle of rotation of drive shaft 30 as the pistons reciprocate. As the pressure in each cylinder 14 is reduced to low pressure on the return stroke of each piston 16, the higher pressure fluid in otherwise closed lubricating passageway 40, 42 is again driven between the walls of each cylinder 14 and the outer circumference of body portion 22 of each piston 16 into the valve end of each cylinder 14 experiencing such pressure reduction.

However, special attention of persons skilled in the art is called to the fact that this just-mentioned minimal flow of fluid back into cylinder 14 is not "lost". Instead, it is immediately returned to the well known closed hydraulic fluid loop that interconnects the pump and motor. Further, this minimal flow of fluid does not return to a sump and, therefore, does not have to be replenished into the closed loop hydraulic system by a charge pump. Finally, closed continuous lubricating passageway 40, 42 is immediately replenished by the entrance of a similar minimal flow of high-pressure fluid from the valve end of each cylinder experiencing increased pressure.

As mentioned above, there is minimal blow-by loss from closed continuous lubricating passageway 42 that interconnects all lubricating channels 40. That is, there is still some minimal fluid flow that leaks from this closed continuous lubricating passageway past the seals 44 at the end of each cylinder 14. However, any such minimal blow-by is instantly replenished by a similar minimal flow of high pressure fluids entering around the opposite end of each piston 16.

The just described lubrication arrangement is not only remarkably simple, and it also permits a similar simplification of the pinion/swash-plate interface apparatus of the hydraulic machine to further reduce the cost of manufacture and operation.

To complete the description of hydraulic motor 10, the pinion/swash-plate interface apparatus shown in FIG. 1 comprises only (a) rotor 28 mounted on drive shaft 30 using conventional needle and thrust bearings and (b) a simple spring-biased hold-down assembly for maintaining piston shoes 24 in constant contact with the rotating and nutating flat surface 26 of rotor 28. [Note: Three embodiments of the invention's simplified pinion/swash-plate interface assemblies are disclosed. While only the first of these hold-down assemblies is shown in combination with the motor and pump illustrated in FIGS. 1 and 3, each is described in greater detail in a separate section below.]

The first embodiment of the invention's hold-down assembly, as shown in FIG. 1, includes a coil spring 50 that is positioned about shaft 30 and received in an appropriate crevice 52 formed in cylinder block 12 circumferentially about axis 32. Spring 50 biases a hold-down element 54 that is also positioned circumferentially about shaft 30 and axis 32. Hold-down element 54 is provided with a plurality of openings, each of which surrounds the neck 20 of a respective piston 16. A respective special washer 56 is positioned between hold-down element 54 and each piston shoe 24. Each washer 56 has an extension 58 that contacts the outer circumference of a respective shoe 24 to maintain the shoe in contact with flat face 26 of rotor 28 at all times.

Just described hydraulic motor 10, with its remarkable simplification of both lubrication and the piston/swash-plate interface, is efficient, easy to manufacture, and economical to operate.

Variable Hydraulic Pump

A second preferred embodiment of a hydraulic machine in accordance with the invention is illustrated in FIG. 3. A variable hydraulic pump 110 includes a modular fixed cylinder block 112 which is identical to cylinder block 12 of hydraulic motor 10 shown in FIG. 1 and described above. Cylinder block 112 has a plurality of cylinders 114 (only one shown) in which a respective plurality of mating pistons 116 reciprocate between the retracted position of piston 116 and variable extended positions (the maximum extension being shown in the position of piston 116'). Each piston has a spherical head 118 that is mounted on a neck 120 at one end of an elongated axial cylindrical body portion 122 that, in the embodiment shown, is substantially as long as the length of each respective cylinder 114. Each spherical piston head 118 fits within a respective shoe 124 that slides over a flat face 126 formed on the surface of a rotor 128 that, as will be discussed in greater detail below, is pivotally attached to a drive element, namely, shaft 130 that is supported on bearings within a bore in the center of cylinder block 112.

In a manner similar to that explained above in regard to hydraulic motor 10, variable pump 110 also is provided with a modular valve assembly 133 that is bolted as a cap on the left end of modular cylinder block 112 and, similarly, includes a plurality of spool valves 134 (only one shown) that regulate the delivery of fluid into and out cylinders 114.

As indicated above, each of the machines disclosed can be operated as either a pump or as a motor. For the description of this preferred embodiment, the variable-angle swash-plate machine 110 shown in FIG. 3 is being operated as a pump, and drive shaft 130 is driven by a prime mover (not shown), e.g., the engine of a vehicle. Therefore, during the one half of each revolution of drive shaft 130, lower pressure fluid is drawn into each respective cylinder 114 entering a port 137 from a "closed loop" of circulating hydraulic fluid through inlet 136 as each piston 116 is moved to an extended position; and during the next half of each revolution, the driving of each respective piston 116 back to its fully retracted position directs high pressure fluid from port 137 into the closed hydraulic loop through outlet 139. The high pressure fluid is then delivered through appropriate closed loop piping (not shown) to a mating hydraulic pump, e.g., pump 12 discussed above, causing the pistons of the mating pump to move at a speed that varies with the volume (gallons per minute) of high pressure fluid being delivered in a manner well known in the art.

Once again referring to modular cylinder block 112, it, is constructed identical to cylinder block 12 which has already been described. That is, the cylindrical wall of each cylinder 114 is transected radially by a respective lubricating channel 140 formed circumferentially therein. A plurality of passageways 142 interconnect all lubricating channels 140 to form a continuous lubricating passageway in cylinder block 112. A cross-section of cylinder block 112 taken in the plane 2—2 looks exactly as the cross-sectional view of cylinder block 12 in FIG. 2.

In effect, almost all of the discussion above relating to the invention's continuous lubricating passageway 40, 42 with reference to the apparatus of hydraulic motor 10 shown in FIGS. 1 and 2, applies equally to the operation of continuous lubricating passageway 140, 142 in cylinder block 112 of hydraulic pump 110 shown in FIG. 3, including the fairly extreme minimization of loss of lubricating fluid from each lubricating channel 140 by optionally including a surrounding seal 144 located near the open end of each cylinder 114. Similarly, the flow of lubricating fluid in closed continuous lubricating passageway 140, 142 is moderate but continuous as the result of a secondary minimal fluid flow in response to piston motion and to the changing pressures in each half-cycle of rotation of drive shaft 130 as the pistons reciprocate. Of course, as is different in pump 110, lower fluid pressure is present in each cylinder 114 when each piston 116 is moving to an extended position, while the source of the high pressure fluid that is forced between the walls of the cylinders and the outer circumference of each piston 116 occurs as each piston 116 is being driven from its extended position to its fully retracted position by the rotation of drive shaft 130 by the prime mover (not shown).

However, once again special attention of persons skilled in the art is called to the fact that this just-mentioned secondary minimal fluid flow back into each cylinder 114 is not "lost". Instead, it is immediately returned to the well known closed hydraulic fluid loop that interconnects the pump and motor. That is, this secondary fluid flow does not return to a sump and, therefore, does not have to be replenished into the closed loop hydraulic system by a charge pump. Also, while there may be a minimal blow-by that leaks from closed continuous lubricating passageway 140, 142 past the seals 144 at the end of each cylinder 114, any such minimal blow-by is instantly replenished by a similar minimal fluid flow entering around the opposite end of each piston 116 experiencing increased pressure.

As discussed in the preamble above, the invention permits the machine's swash-plate apparatus to be simplified (a) by the omission of the dog-bones that normally are mounted between the outer end of each piston and a nutating-only wobbler portion of a conventional rotating/nutating swash-plate and (b) in the embodiments illustrated in FIGS. 1 and 3, by the omission of the wobbler portion itself as well as the apparatus conventionally required for mounting the non-rotating wobbler to the rotating/nutating rotor portion of the swash-plate.

Still referring to FIG. 3, rotor 128 of pump 110 is pivotally mounted to drive shaft 130 about an axis 129 that is perpendicular to axis 132. Therefore, while rotor 128 rotates with drive shaft 130, its angle of inclination relative to axis 130 can be varied from 0° (i.e., perpendicular) to ±25°. In FIG. 3, rotor 128 is inclined at +25°. This variable inclination is controlled as follows: The pivoting of rotor 128 about axis 129 is determined by the position of a sliding collar 180 that surrounds drive shaft 130, and is movable axially relative thereto. A control-link 182 connects collar 180 with rotor 128 so that movement of collar 180 axially over the surface of drive shaft 130 causes rotor 128 to pivot about axis 129. For instance, as collar 128 is moved to the right in FIG. 3, the inclination of rotor 128 varies throughout a continuum from the +25° inclination shown, back to 0° (i.e., perpendicular), and then to −25°.

The axial movement of collar 180 is controlled by the fingers 184 of a yoke 186 as yoke 186 is rotated about the axis of a yoke shaft 190 by articulation of a yoke control arm 188. Yoke 186 is actuated by a conventional linear servo-mechanism (not shown) connected to the bottom of yoke arm 188. In this preferred embodiment, while the remainder of the elements of yoke 186 are all enclosed within a modular swash-plate housing 192 and yoke shaft 190 is supported in bearings fixed to housing 192, yoke control arm 188 is positioned external of housing 192.

It will also be noted that swash-plate rotor 128 is balanced by a shadow-link 194 that is substantially identical to control-link 182 and is similarly connected to collar 180 but at a location on exactly the opposite side of collar 180.

Piston Shoe Hold-Down Assemblies

Fluid pressure constantly biases pistons 116 in the direction of rotor 128, and the illustrated conventional thrust plate assembly is provided to carry that load. However, at the speeds of operation required for automotive use (e.g., 4000 rpm) additional bias loading is necessary to assure constant contact between piston shoes 124 and flat surface 126 of rotor 128. In view of the invention's omission of conventional dog-bones, the variable hydraulic machines of this invention provide such additional bias by using one of three simple spring-biased hold-down assemblies, the first being similar to that already briefly described above in regard to hydraulic motor 10 in FIG. 1.

(a) Hold-Down Assembly with Single-Spring Bias

The following description of the invention's first embodiment for a hold-down assembly continues to refer to FIG. 3, but reference is now also made (a) to FIG. 4A, which shows an enlarged view taken in the plane 4A—4A of FIG. 3 when viewed in the direction of the arrows, and (b) to FIG. 4B, which shows an enlargement of the same view of shown in FIG. 1 with parts removed for clarity.

The hold-down assembly for pump 110 includes a coil spring 150 that is positioned about shaft 130 and received in an appropriate crevice 152 formed in cylinder block 112 circumferentially about axis 132. Coil spring 150 biases a hold-down element 154 that is also positioned circumferentially about shaft 130 and axis 132. Hold-down element 154 is provided with a plurality of circular openings 160, each of which surrounds the neck 120 of a respective piston 116. A plurality of special washers 156 are positioned, respectively, between hold-down element 154 and each piston shoe 124. Each washer 156 has an extension 158 that contacts the outer circumference of a respective shoe 124 to maintain the shoe in contact with flat face 126 of rotor 128 at all times.

The positions of the just-described parts of the swash-plate and piston shoe hold-down assembly change relative to each other as the inclinations of rotor 128 is altered during machine operation. These changes in relative position are illustrated at various inclinations of rotor 128, namely, at, +25°, in FIGS. 4A and 4B; at +15° in FIGS. 5A and 5B; at 0° in FIGS. 6A and 6B; and at −25°, in FIGS. 7A and 7B. [NOTE: Persons skilled in the art will appreciate that each piston shoe 124 has a conventional pressure-balancing cavity centered on the flat surface of shoe 124 that contacts flat face 126 of rotor 128, and that each respective shoe cavity is connected through an appropriate shoe channel 162 and piston channel 164 to assure that fluid pressure present at the shoe/rotor interface is equivalent at all times with fluid pressure at the head of each piston 116. Since piston channel 164 passes through the center of spherical head 118 of each piston 116, the position of channel 164 can be used to facilitate appreciation of the relative movements of the various parts of the hold-down assembly.]

Referring to the relative position of these parts at the 0° inclination shown in FIGS. 6A and 6B, each piston channel 164 (at the center of each spherical head 118 of each piston 116) has the same radial position relative to each respective circular opening 160 in hold-down element 154. As can be seen from the views in the other illustrated inclinations of swash-plate rotor 128, at all inclinations other than 0°, the relative radial position of each piston channel 164 is different for each opening 160, and the relative positions of each special washer 156 is also different.

It must be appreciated that, at each of these illustrated swash-plate inclinations, the different relative positions at each of the nine openings 160 are themselves constantly-changing as rotor 128 rotates and nutates through one complete revolution at each of these inclinations. For instance, at the 25° inclination shown in FIG. 4A, if during each revolution of rotor 128, one were to watch the movement occurring through only the opening 160 at the top (i.e., at 12:00 o'clock) of hold-down element 154, the relative position of the parts viewed in the top opening 160 would serially change to match the relative positions shown in each of the other eight openings 160.

That is, at inclinations other than 0° (e.g., at −25° shown in FIG. 7A), during each revolution of rotor 128, each special washer 156 slips over the surface of hold-down element 154 as, simultaneously, each shoe 124 slips over the flat face 126 of rotor 128; and each of these parts changes relative to its own opening 160 through each of the various positions that can be seen in each of the other eight openings 160. These relative motions are largest at ±25° and each follows a cyclical path (that appears to trace a lemniscate, i.e., a "figure-eight") that varies in size with the angular inclinations of swash-plate rotor 128 and the horizontal position of each piston 116 in fixed cylinder block 112.

Therefore, to assure proper contact between each respective shoe 124 and flat surface 126 of rotor 128, in preferred embodiments a size is selected for the boundaries of each opening 160 so that the borders of opening 160 remain in contact with more than one-half of the surface of each special washer 156 at all times during each revolution of rotor 128 and for all inclinations of rotor 128, as can be seen from the relative positions of special washers 156 and the borders of each of the openings 160 in each of the drawings from FIG. 4A through FIG. 7A. As can be seen from the drawings, a circular border is preferred for each opening 160.

(b) Hold-Down Assembly with Multiple-Spring Piston Bias

The second embodiment of the invention's hold-down assembly, while slightly more difficult to assemble, is considerably simpler and less expensive. This second embodiment is shown schematically in FIG. 8 in an enlarged, partial, and cross-sectional view of a single piston of a further hydraulic machine 210 according to the invention. Piston 216 is positioned in modular fixed cylinder block 212 within cylinder 214, the latter being transected radially by a respective lubricating channel 40" formed circumferentially therein. In the same manner as described in relation to the other hydraulic machines already detailed above, each lubricating channel 40" is interconnected with similar channels in the machine's other cylinders to form a continuous lubricating passageway in cylinder block 212; and, similarly, an optional surrounding seal 44" may be located near the open end of each cylinder 214 to further minimize the loss of lubricating fluid from each lubricating channel 40".

The only difference between fixed cylinder block 212 and the modular cylinder blocks disclosed in FIGS. 1 and 3 is that fixed cylinder block 212 includes neither a large axially circumferential coil spring nor an axially circumferential crevice for holding same.

While not shown, the modular fixed cylinder block 212 of hydraulic machine 210 can be connected to either a modular fixed-angle swash-plate assembly (as shown in FIG. 1) or a modular variable-angle swash-plate assembly (as shown in FIG. 3), but in either case, hydraulic machine 210 provides a much simpler hold-down assembly. Namely, the hold-down assembly of this embodiment comprises only a respective conventional piston shoe 224 for each piston 216 in combination with only a respective coil spring 250, the latter also being associated with each respective piston 216.

Each piston shoe 224 is similar to the conventional shoes shown in the first hold-down assembly just discussed above and, similarly, is mounted on the spherical head 218 of piston 216 to slide over the flat face 226 formed on the surface of the machine's swash-plate rotor 228 in a manner similar to that explained above. Each coil spring 250 is, respectively, seated circumferentially about hydraulic valve port 237 at the valve end of each respective cylinder 214 and positioned within the body portion of each respective piston 216.

Again, in the manner just explained above, each shoe 224 slips over flat face 226 of rotor 228 with a lemniscate motion that varies in size with the horizontal position of each piston 216 and the inclination of rotor 228 relative to axis 230. During normal operation of hydraulic machine 210, shoes 224 are maintained in contact with flat face 226 of the swash-plate by hydraulic pressure. Therefore, the spring bias provided by coil springs 250 is only minimal but still sufficient to maintain effective sliding contact between each shoe 224 and flat face 226 in the absence of hydraulic pressure at the valve end of each respective cylinder 214.

It has been found that the just-described minimal bias of springs 250 not only facilitates-assembly but is also sufficient to prevent entrapment of tiny dirt and metal detritus encountered during assembly and occasioned by wear. Further, special attention is again called to the fact that this second embodiment provides this necessary function with only a few very inexpensive parts.

(c) Hold-Down Assembly with Multiple-Spring Shoe Bias

Referring to FIG. 9, a preferred hold-down assembly is disclosed in a preferred hydraulic machine, namely, pump 310 that, while being substantially similar to pump 110 illustrated in FIG. 3 and described in detail above, includes an improved conventional split swash-plate arrangement.

As with the other hydraulic machines described above, a plurality of pistons 316, each including a respective sliding shoe 324, reciprocate in respective cylinders 314 formed in cylinder block 312 that is identical to cylinder blocks 12 and 112 as described above. Each shoe 324 slides on the flat face 326 formed on a wobbler 327 that is mounted on a mating rotor 328 by appropriate needle bearings 372, 374 that permit wobbler 327 to nutate without rotation while rotor 328 both nutates and rotates in the manner well known in the art.

It will be apparent to those skilled in the art, that the inclination of wobbler 327 and rotor 328 about axis 329 is controlled by the position of a sliding collar 380, a control link 382 and a balancing shadow link 394 in exactly the same manner as described above in regard to pump 110 illustrated in FIG. 3.

Shoes 324 are held down by a hold-down assembly substantially identical to the first hold-down assembly described in detail in sub-section (a) above. However, in this preferred embodiment, the large single coil spring 150 is replaced by a plurality of smaller individual coil springs as follows:

A hold-down plate 354 is fixed to wobbler 327 and is otherwise identical to hold-down element 154 described in detail above with reference to FIGS. 4–7. Similarly, each shoe 324 receives the circumferential extension of a respective special washer 356 that is identical to each special washer 156 as described in detail above, and the neck of each piston 316 is positioned within one of a corresponding plurality of respective openings 360 formed through hold-down plate 354, all exactly similar to the apparatus of the first hold-down assembly described in detail in sub-section (a) above.

While wobbler 327 does not rotate with rotor 328, the nutational movement of wobbler 327 is identical to the nutational movement of rotor 328 and, therefore, the relative motions between shoes 324 and the flat surface 326 of wobbler 327 are also identical to that described in detail in sub-section (a) above.

In this embodiment, a plurality of individual coil springs 350 provides the minimal spring bias that is necessary, in the absence of hydraulic pressure at the valve end of each cylinder 314, to maintain effective sliding contact between each shoe 324 and flat face 326 of wobbler 327. Each coil spring 350 is positioned circumferentially about each shoe 324, being captured between each special washer 356 and a collar formed just above the bottom of each shoe 324.

The preferred embodiment that has just been described provides the same remarkable improvement in volumetric efficiency with full lubrication as the other embodiments disclosed. Further, it also provides a dramatic change in the dynamics of the operation of the sliding shoes, greatly improving efficiency and significantly reducing wear and the concomitant costs related to such wear.

The invention's hydraulic machines all provide remarkably improved volumetric efficiencies with effective lubrication as well as piston/swash-plate interface assemblies that provide further economies by being relatively simple and inexpensive to manufacture and by reducing the number of parts required for efficient operation.

We claim:

1. In a hydraulic machine having a plurality of pistons reciprocally mounted in respective cylinders formed in a cylinder block and positioned circumferentially at a first radial distance about the rotational axis of a drive element, each said piston having an axially cylindrical body portion and a head end and each respective cylinder having a valve end and an open head portion beyond which said head end of each said piston extends at all times, and said pistons also having a stroke varying up to a predetermined maximum for receiving and delivering pressurized fluid, the improvement comprising:

a respective lubricating channel formed in the cylindrical wall of each said cylinder in said cylinder block for retaining said pressurized fluid;

all of said lubricating channels being interconnected to form a continuous lubricating passageway in said cylinder block;

said pressurized fluid being retained in said continuous lubricating passageway by the substantial closure of each said respective lubricating channel by the outer surface of the axially cylindrical body of each respective piston during the entire stroke of each said piston, the only source of pressurized fluid received by said continuous lubricating passageway is being a minimal flow of said fluid between each said respective cylindrical wall of each said cylinder and said axial cylindrical body of each respective piston; and said closed continuous lubricating passageway being formed entirely within said cylinder block, transecting each said cylinder and being centered circumferentially at substantially the same radial distance as said cylinders are centered about the rotational axis of the drive element.

2. The hydraulic machine of claim 1 further comprising a sealing member located in proximity to said open head portion of each said cylinder for substantially eliminating blow-by between each said piston and said open head portion of each respective cylinder.

3. The hydraulic machine of claim 1 further comprising a clearance between said respective body portions of said pistons and said respective cylinders, the dimensions of said clearance being selected to assure said minimal flow of fluid between each said respective cylindrical wall of each said cylinder and said axial cylindrical body of each respective piston is sufficient to cause movement of lubricating fluid in said closed continuous lubricating passageway upon the occurrence of at least one of (a) piston motion, and (b) changing fluid pressures at said valve end of each respective cylinder.

4. The hydraulic machine of claim 1 in combination with a second hydraulic machine according to claim 1, said hydraulic machines being connected to each other in a conventional closed loop of circulating hydraulic fluid wherein high-pressure fluid exiting from the first said hydraulic machine is directly delivered to the second said hydraulic machine, while low-pressure fluid exiting from the second said hydraulic machine is directly delivered to the input of the first said hydraulic machine, and wherein said miniffial flow of fluid between each said piston and said valve end of each respective cylinder of both said hydraulic machines to and from said closed continuous lubricating passageway is immediately returned to said closed loop of circulating hydraulic fluid without requiring the use of a charge pump.

5. The hydraulic machine of claim 1 further comprising a swash-plate with a flat face, said swash-plate having an inclination relative to said rotational axis of the drive element, and wherein said head end of each piston is maintained in effective sliding contact with said flat face of said swash-plate during all relative rotary motions between said pistons and said swash-plate, said stroke of said pistons being determined in accordance with the inclination of said swash-plate, and said body portion of each piston has an elongated axial cylindrical length sufficient to be supported within said respective cylinder to assure minimal lateral displacement of said head end of said piston when in relative sliding contact with said flat face at all times during said stroke.

6. The hydraulic machine of claim 5 wherein said cylinder block is fixed in a housing, said swash-plate rotates with said drive element and includes a rotor that rotates and nutates, and said flat face is located on said rotor.

7. The hydraulic machine of claim 5 wherein said cylinder block is fixed in a housing and said swash-plate has a split design comprising a rotor that rotates and nutates and a wobbler that only nutates; and said flat face is located on said wobbler.

8. The hydraulic machine of claim 7 wherein the inclination of said swash-plate is variable and the stroke of said pistons varies up to said predetermined maximum in accordance with said inclination.

9. The hydraulic machine of claim 5 wherein each piston has a spherical head end connected to said body portion by a narrowed neck portion, and said machine further comprises:

a respective sliding shoe pivotally affixed to said spherical head end of each said respective piston and maintained in effective sliding contact with said flat face of said swash-plate during all relative rotary motions between said pistons and said flat face; and a hold-down assembly for biasing said sliding shoes toward said flat face of said swash-plate.

10. The hydraulic ifiachine of claim 9 wherein said hold-down assembly comprises:

a hold-down element having a plurality of respective openings, the boundary of each said respective opening in said hold-down plate being located in proximity to said narrowed neck portion of each respective piston; and a respective washer fitted about said narrowed neck portion of each piston between said hold-down plate and each respective sliding shoe, each said respective washer having an extension aligned cylindrically for circumferentially contacting each said respective sliding shoe;

said washers being in sliding contact with said hold-down plate for movement relative thereto in response to the changing relative positions of said sliding shoes when said flat face of said rotor is inclined relative to said rotational axis of the drive element.

11. The hydraulic machine of claim 10 wherein the boundary of each said respective opening in said hold-down plate is designed to be in contact with more than one-half of the outer circumference of each said respective washer at all times during said relative movements.

12. The hydraulic machine of claim 10 wherein said machine further comprises a minimal spring bias sufficient to maintain said effective sliding contact between each said respective shoe and said flat face of said swash-plate In the absence of hydraulic pressure at said valve end of each respective cylinder.

13. The hydraulic machine of claim 12 wherein said minimal spring bias is provided by a coil spring positioned circumferentially about the rotational axis of said drive element at less than said first radial distance for biasing said hold-down plate against said washers.

14. The hydraulic machine of claim 12 wherein said minimal spring bias is provided by a plurality of springs, each said spring being positioned respectively between said hold-down plate and one of said respective washers.

15. The hydraulic machine of claim 9 wherein said hold-down assembly comprises only:

a minimal spring bias sufficient to maintain said effective sliding contact between each said shoe and said flat face of said swash-plate in the absence of hydraulic pressure at said valve end of each respective cylinder, and said minimal spring bias is provided by a plurality of springs, each said spring being positioned respectively between said body portion of each respective piston and said valve end of each respective cylinder.

* * * * *

UNITED STATES PATENT AND TRADEMARK OFFICE
CERTIFICATE OF CORRECTION

PATENT NO. : 6,983,680 B2
DATED : January 10, 2006
INVENTOR(S) : Gleasman et al.

It is certified that error appears in the above-identified patent and that said Letters Patent is hereby corrected as shown below:

Column 15,
Line 4, replace "is being" with -- being --.
Line 27, replace "pistion" with -- piston --.
Line 39, replace "miniffial" with -- minimal --.

Signed and Sealed this

Fourth Day of April, 2006

JON W. DUDAS
*Director of the United States Patent and Trademark Office*